June 27, 1967     I. BARNETT     3,328,501
EXTRUSION PROCESS FOR ORIENTING FIBERS IN MOLDING MATERIAL
Original Filed July 2, 1962     3 Sheets-Sheet 1
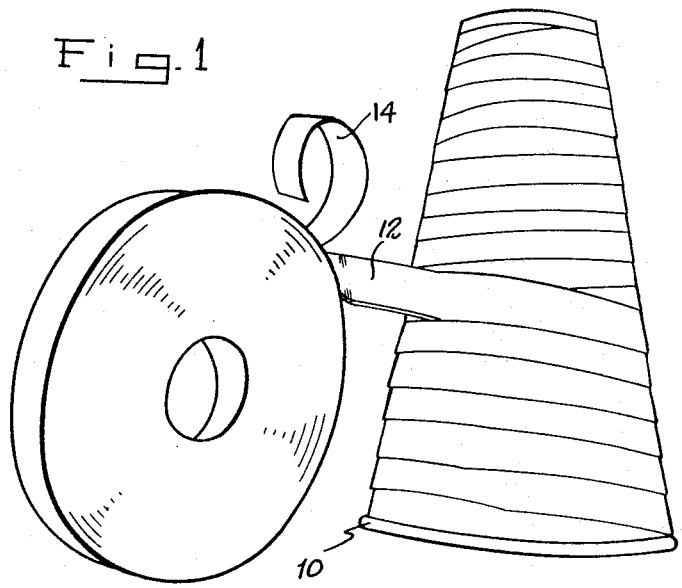
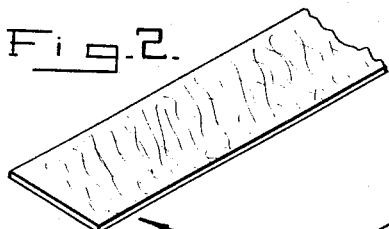
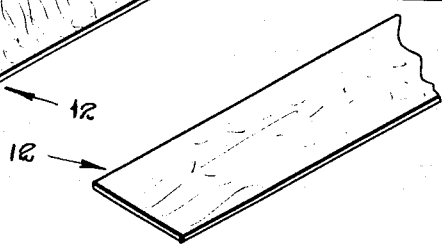
INVENTOR.
IRVIN BARNETT
BY
ATTORNEY

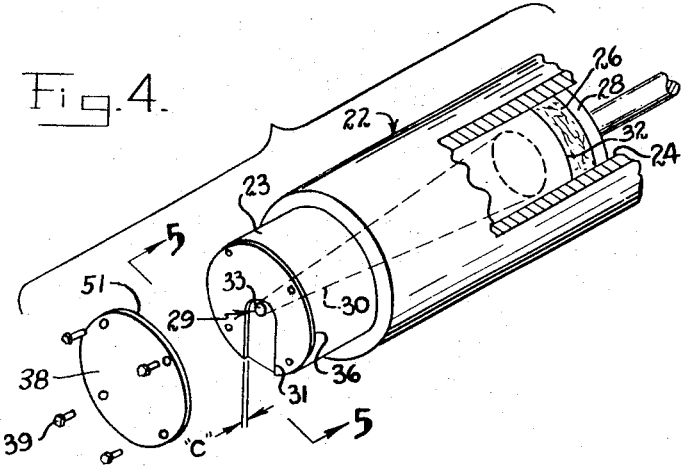

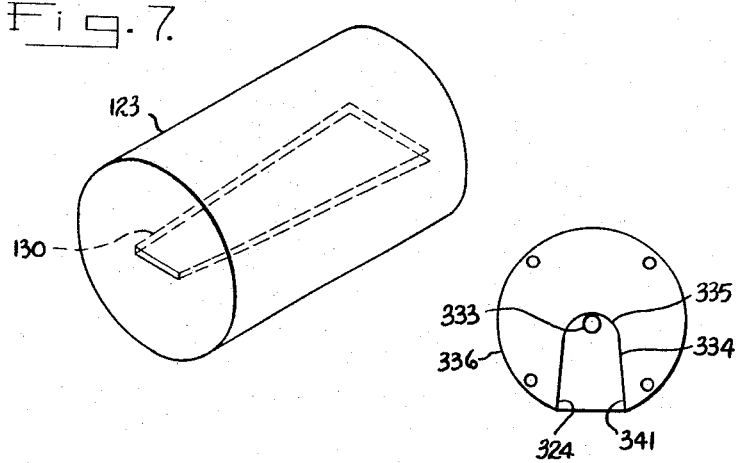
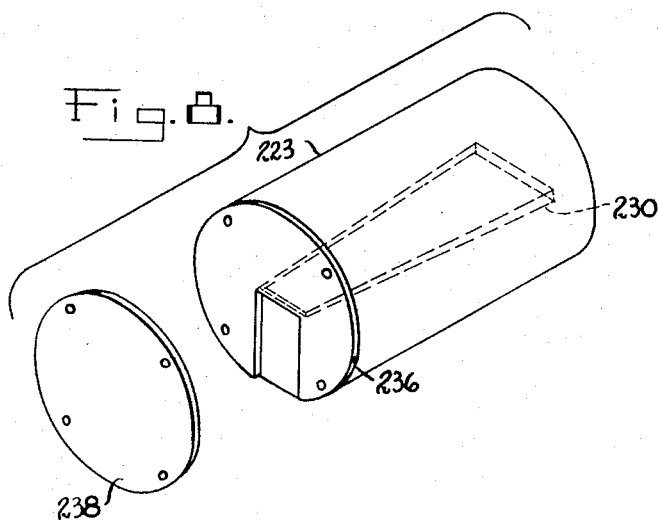

United States Patent Office 3,328,501
Patented June 27, 1967

3,328,501
EXTRUSION PROCESS FOR ORIENTING FIBERS IN MOLDING MATERIAL
Irvin Barnett, Martinsville, N.J., assignor to Johns-Manville Corporation, New York, N.Y., a corporation of New York
Original application July 2, 1962, Ser. No. 206,587, now Patent No. 3,241,184, dated Mar. 22, 1966. Divided and this application Oct. 30, 1964, Ser. No. 407,730
4 Claims. (Cl. 264—108)

This is a division of application Ser. No. 206,587, filed July 2, 1962, now U.S. Patent No. 3,241,184. This invention relates to a method for preparing fiber-reinforced moldable material containing reinforcing fibers, from which material plastics are made. More particularly the invention relates to a method of extruding moldable material containing fibers into a tape. Most particularly, this invention relates to a method for extruding compositions containing fibers in a particular orientation and in a particular manner to preferentially orient the fibers. Such articles find particular adaptation in high temperature insulation systems such as those employed in connection with rocket missiles and other aerospace structures. In such systems it is important that the insulating material be substantially homogeneous throughout its length, resist ablation in "chunks," and have extended "shelf life," i.e. remain plastic and easily shapable for a long time after formation. It is also highly desirable that the moldable material be in a form adapted for use with automatic equipment such as tape winders.

Heretofore, it has not been considered feasible to extrude fiber reinforced moldable material for it is generally known that the fibers in extruded fiber reinforced products are generally oriented in the direction of extrusion. Such orientation of all of the fibers in a moldable material is not desirable in producing tapes adapted particularly for use in ablation systems because there is little or no interlock between successive ablative layers. Furthermore, as the amount of fibers is increased in such fiber reinforced products there is more of a tendency for the individual fibers to separate as individual threads. Such separation produces cleavages or voids in the extruded product which result in a non-uniform product and one which loses value as an ablation material.

In prior art processes felting and papermaking equipment have been employed to produce moldable material in mat form. However, there are certain disadvantages in producing such mats. The mats are usually formed of relatively short fiber lengths and then saturated with a resin solution and subsequently dried to a low solvent content in the range of 7 to 12 percent to produce a material having a precured density in the range of 50 to 60 p.c.f. The thickness and uniformity of mats so produced are inconveniently limited. Additionally, the amount of non-fibrous fillers that can be introduced into the mats is substantially limited. Furthermore, the mats are usually made of substantial widths for economic reasons, which widths are not convenient for use with automatic tape winding equipment and if cut, additional operations and expenses are involved.

The moldable materials containing fibers chosen in the past have proven to be insufficient in several other respects. These materials consist generally of a non-woven felt pretreated with small amounts of binder or other primary bond to form a rigid oriented mat. These mats are processed in a normal manner which comprises impregnating or preimpregnating the mat with a resinous material, completely drying the thus treated mat and partially curing the resin. Normally, several of these sheets are laminated to provide the desired thickness of the final product. However, these materials have not exhibited good "flow" properties. This is attributable to the use of the primary bond employed to form the mat. In subsequent molding operations the resin material flows but the fibers are deterred from migrating because of the locking action of the primary bond. Consequently, there is no uniform migration of all the constituents of the mat and the areas where mats are joined or butted together are deficient in fibers and form undesirable channels.

It is common practice to incorporate various filler materials in molding compounds of thermosetting plastic resin in order to produce molding compound which not only possesses high mechanical strength, but also other good physical characteristics such as heat and flame resistance. Other desirable characteristics include extended shelf life with resulting good workability and flow characteristics. The term "flow" as employed here denotes the ability of the resin, fibers and fillers to migrate uniformly and together, as opposed to having any of the ingredients preferentially migrate in respect to the other ingredients. In the past it has been acknowledged that such materials as asbestos fibers, glass fibers, mineral wool and certain synthetic fibers have been used to impart reinforcing characteristics to the resinous composition. This additionally provides greater tensile, flexural and other strength characteristics to the molded article that could not be obtained in an unreinforced-plastic material.

Such molding compounds have found particular adaptation in "bag molding." In such an operation, the molding compound is placed in an unconfined mold, the mold placed within a flexible cover, and the compound caused to assume the configuration of the mold by means of a pressure differential. This "bag molding" operation has been used in many different applications. One particular use has been in the production of insulating material for rockets and the like.

Additionally, the molding compositions used in rockets and the like must possess other significant characteristics. Certain parts of rockets are required to withstand very high temperatures. It is highly desirable that a protective liner be incorporated in the rocket in such positions as the motor, nozzle, and nose cone mold to provide a thermal barrier or shield wherein temperatures as high as 13,000° F. are encountered. In such insulation, it has been found highly advantageous to provide such a thermal barrier which protects the surrounding surface by the process of ablation. Ablation, as it is used in relation to thermal insulation, is the absorption of heat during the process of surface material removal by melting and vaporization. The absorption causes the protective surface to remain relatively cool. Certain reinforced plastics have been proven to possess excellent ablation characteristics because of the destruction of their chemical nature requiring an endothermic chemical reaction. Additionally, when it is desirable to have resistance to physical erosion or abrasion, reinforced plastic materials are used.

Consequently, the provision of a more dense molding material in the form of a handleable tape adapted for use with automatic winding equipment would represent an advancement in the art of molding, particularly in applications such as thermal insulations for rocket missiles and the like. Additionally, moldable tape having the following properties would provide further desideratums: (1) a relatively long shelf life, (2) tackiness which will allow hand formation into various intricate shapes after relatively long periods of storage, and which will also deter the formation of the channels between the individual pieces, (3) adhesion to the metal surface to be protected, (4) physical erosion and/or abrasion resistance, (5) resistance against extreme high temperature and flames, and (6) good material flow when finally molded.

Accordingly, it is an object of this invention to provide a method for extruding fiber-reinforced preform material in a form having extended shelf life and improved flow characteristics.

Another object of this invention is to provide a method for extruding fiber-reinforced molding material in tape form.

These objects are accomplished according to the present invention in the following manner:

A supply of fire-resistant fiber, such as asbestos fiber, together with opacifiers and refractory fillers, when desired, and a resin in solution are mixed in a suitable mixer, such as that known as a ribbon type, until a substantially homogeneous mix is obtained. The resin may be a thermosetting phenol formaldehyde condensation product preferably in the amount of 30–70 percent by weight of the final product. The resinous material is in 62 percent solids solution with a solvent carrier such as ethyl alcohol. The percentage of fibers is preferably in the range of 70–30 percent by weight of the final product. When opacifiers and/or refractory fillers are employed, they may replace a percentage of either the fibers or the resin. It has been found that a composition of 45 percent phenolic resin solids, 3 percent titanium dioxide ($TiO_2$) opacifier and 52 percent chrysotile fibers of grade 3R provides excellent results.

The resultant putty-like mix is then dried or precured until the solvent content is reduced to 15 percent ±2 percent, by dry weight, and the resin cure is advanced to a Chang Resin Cure Index [1] of 30±2 in order to assure uniform extrusion.

The mix is then extruded through a specially designed heated die extruder to control the directional orientation of the fibers, preferably at a temperature of 110±5° F. at a pressure of 2000±500 p.s.i. and rolled together with an expendable release sheet to prevent adjacent layers of the extruded material from adhering to each other.

The extruder through which the material is extruded defines a generally L-shaped conduit passage. A first branch of the passage extending from the feed opening is preferably generally a frustum of a cone. The smaller end of the frustum discharges into a second branch of generally semi-oval configuration, the plane of the semi-oval being transverse to the axis of the frustum. The combination of the cone frustum and transverse semi-oval configurations defines a sharply bent passage wherein a substantial portion of the fibers are diverted into random orientation and hence avoid presenting longitudinal lines of potential weakness extending continuously throughout the thickness and length of the tape being formed. The conduit passage terminates in a generally rectangular discharge opening corresponding substantially to the configuration of the cross section desired in the formed tape.

Further objects and advantages of this invention will appear more fully from the following description, particularly when considered in conjunction with the accompanying drawings in which corresponding elements in the various different embodiments are designated by reference numerals having the same last two digits:

FIG. 1 is a pictorial view illustrating a cone form being wound with the moldable material of this invention;

FIG. 2 is a pictorial view of a fragment of the extruded moldable material of this invention illustrating the random fiber orientation at one lateral face;

FIG. 3 is a view of the lateral face opposite to that shown in FIG. 2;

FIG. 4 is a pictorial view of the extruder head assembly of this invention;

FIG. 5 is a front elevational view of the extruder of FIG. 4 taken along lines 5—5 illustrating in more detail the preferred form of plate member defining a branch of the extrusion passage;

FIG. 6 is a view similar to FIG. 5 illustrating an alternate form of plate member;

FIG. 7 is a pictorial view illustrating a form of extruder that was tried in which a satisfactory tape of moldable material containing fibers could not be produced;

FIG. 8 is a view similar to FIG. 7 illustrating another form of extruder in which a satisfactory tape could not be produced; and FIG. 9 is a view similar to FIGS. 5 and 6 but showing a form of plate member defining a form of extrusion passage branch that was tried but through which satisfactory extruded tapes could not be produced.

Referring to FIG. 1, the cone 10 to be covered and insulated is thereshown being wound with a tape 12 embodying this invention. The tape 12 is preferably in roll form, having an expendable release sheet 14, for use with suitable automatic winding mechanism (not shown) employed in carrying out such operations. However, it is to be understood that the tape 12 can be also used in manual mock-up operations.

The extruding apparatus employed to produce the tape 12 may be observed in FIG. 4. The extruder 20 thereshown comprises a head 22 defining a chamber 24 adapted to receive a supply of material 26 to be extruded and the expresser 28, shown to be in the form of a plunger. The head 22 houses a nozzle 23 defining a conduit passage branch 30 which together with branches 31 and 34 comprise the overall extrusion passage 29 of generally L-shaped configuration. The branch 30 is preferably in the form of a frustum of a cone, the large base portion 32 of the cone being toward the expresser 28. The passage branch 30 discharges into a transverse passage branch 34, a portion of which is in the form of a semi-oval 35, which may be defined by an insertable plate member 36. A detachable end cap 38 is then provided to close the outer plane area of the branch 34. The cap 38 and plate member 36 are secured to nozzle 23 by suitable means such as bolts 39.

The details of the branch 34 which defines the essential functional extrusion passage portion of this invention may be seen in more detail in FIG. 5. The branch 34 has a generally semi-oval portion 35 defined by curved lines 43 and 44, each comprising a series of successive segments of different curvatures, and the two series being generally symmetrical about a central axis 46 extending through the plane area of the semi-oval portion 35. The branch 34 discharges into what may be termed a substantially rectangular branch 40 defined by a pair of parallel sides 41 and 42 tangent to the extremities of the arcuate lines 43 and 44 of the semi-oval portion 35. When the semi-oval portion 35 is in the form of an ellipse the preferred relation between the branch 34 and the discharge end 33 of the cone frustum 30 is such that the focus of the semi-ellipse is coincident with the center of the cone frustum end.

In one form of apparatus that has been built and tried, the discharge end 33 of the cone frustum passage 30 has a diameter of 5/16 inch. The semi-oval portion 35 is in the form of an approximate semi-ellipse having a semi-major axis of 2½ inches, a semi-minor axis of ¾ inch and a terminal rectangular portion 1½ inches wide (dimension D) and .005 inch thick (dimension C). Thus the space between the edge of cone frustum opening and the outer terminus 37 of the semi-major axis (dimension A) is in the order of 5/32 inch. This dimension is considered important when forming a tape which utilizes a particular fiber length for reasons to be hereinafter described.

An exemplary procedure for carrying out the method of the invention comprises mixing a supply of fibers such as chrysotile asbestos fibers of commercial grade 3R or longer, Quebec standard screen test, an opacifier such as titanium dioxide, and a phenolic resin, in an alcohol solvent, in a suitable ribbon type mixer until a substantially homogeneous mix is obtained.

In forming composition tapes which are to be molded into products which are to be subjected to erosive conditions, it is desirable to provide a tape of maximum density. Hence, it is desirable to maintain the maximum fiber con- ---
[1] How To Determine Resin Cure by John C. H. Chang, Modern Plastics, April 1961, page 117.

tent, since the fibers are more dense than the resin. The fiber content is preferably in the range of 30–70 percent, based on the dry weight. The resin content is preferably in the range of 70–30 percent, based upon the dry weight of resin solids. The indicated percentages are expressed as a percentage by weight of the final product. It is to be understood that resins of the elastomer modified type may be employed. The resinous solution may be represented by a resin such as a thermosetting phenol formaldehyde condensation product such as that sold under the trade name Resinox SC–1008 by Monsanto Chemical Company. This material contains approximately 62 percent solids. The remainder of the solution preferably comprises alcohol. It is undesirable to exceed the upper range of the resin content because a high solvent content, during the extrusion step, results in the resin being moved or expressed at an undesirable different rate than that at which the fibers are expressed. It is also undesirable to go below the lower range because the resultant product will have a reduced "shelf life." A reduced resin content also results in a reduction of the chemical constituents of the formulation which contribute to the ablation process by virtue of their endothermic reaction nature.

The opacifier content depends largely upon the particular opacifier chosen and the desired property in the extruded product. When opacifiers are included, the fiber content or the resin content may be correspondingly reduced. The opacifiers are chosen according to their "fire retardant" characteristics. "Fire retardant" as used in this specification is intended to include those materials or fillers which although not originally fire retardant become so because of a chemical change when subjected to later applied heat. The opacifiers may be of metallic type combining radiation reflection and absorption, e.g., metallic aluminum or silicon powder; or, radiation absorbing type—e.g., carbon black or finely divided pigments such as ilmenite, maganese oxide, or chromium oxide; or radiation scattering type—e.g., zircon, titanium dioxide, or other materials with a high index of infrared refraction.

The following is an example of a typical formulation based on dry weight that has produced excellent results:

| | Percent |
|---|---|
| Resin solids (73 lbs. of resinous solution @ 60% solids per 100 lbs. of product desired) | 45 |
| TiO$_2$ opacifier | 3 |
| Chrysotile grade 3R asbestos fiber | 52 |

The putty-like mix is then partially dried or precured to a standard solvent content and resin cure advancement to assure uniform extrusion and consequently uniform product from one production run to another. The mix is preferably dried so that the solvent content before extrusion is 15 percent±2 percent and the resin cured to a Chang Resin Cure Index of 30±2.

A pug 26 of the putty-like mix is then placed into the extruder 22 embodying this invention to preferentially control the directional orientation of the fibers. It is felt that for best results the extruder chamber 24 should be heated, by any suitable and well known means and hence not shown, to maintain a temperature in the order of 110° F. and that the mix be expressed at a pressure of 2000±500 p.s.i.

The mix is expressed through a first and longitudinal branch 30 of the generally L-shaped extrusion passage which branch 30 extends in a direction corresponding to the direction in which the expressing force or plunger moves. A cone frustum configuration for this first passage is preferred in order to facilitate the transition from a relatively large passage to a relatively restricted passage and to commence the orientation of the fibers in a pattern that can be controlled.

From the relatively restricted end of the first conduit branch the mix is expressed in a sharply bent path into an expanded second branch 34 which branch 34 is defined by the semi-oval portion 35 formed in the plate member 36. It will be understood that the branch 34 may also be formed in the nozzle head 23 proper and need not be a separate plate. However, through the use of such plates, the same extruder may be employed to extrude various widths and configurations of tapes. The plane of the semi-oval portion 35 is transverse to the axis of the passage branch 30 so that the fibers are first diverted as they strike the end plate 38 and then the longer fibers are further diverted as they strike the arcuate sidewalls corresponding to curved lines 43 and 44 defining the semi-oval. As previously indicated, the spacing of the restricted or discharge end 31 of the branch passage 30 in relation to the arcuate sides of the semi-oval portion 34 is considered to be important. Preferably, the distance from the semi-major axis terminus to the edge of the passage 30 (dimension A, in FIG. 5) is just slightly less than the mean length of the fibers that are being expressed and the greatest distance (dimension B, in FIG. 5) of any arcuate portion of the semi-oval from the nearest edge of the passage hole 31 is no greater than the longest fibers being expressed.

For example in using chrysotile fiber grade 3R wherein 56 percent of the fibers are 3/16 inch or longer, the average length is considered to be .216 inch and the longest fiber is deemed to be 13/16 inch long, a high quality tape 1½ inches wide and .005 inch thick has been extruded from an extruder of this invention where the dimension A is 5/32 inch, the dimension B is 19/32 inch, the diameter of the discharge hole 31 is 5/16 inch, and the center of the discharge hole 31 is located at the focus of the semi-ellipse having a semi-minor axis of ¾ inch and a semi-major axis of 1¼ inches.

The product embodying the formulation and method of extrusion of this invention has a precured or premolded density of about 100 p.c.f., which is comparable to the density of heretofore available fiber reinforced moldable felt materials after molding at 100 p.s.i. pressure.

The extruded product is withdrawn without any intentional stretching in order to preserve the fiber orientation. While the exact reason is not known, the extruded product is characterized by the fact that on one of the lateral faces the fibers appear to be in substantial alignment with the direction of extrusion (FIG. 3) and that on the opposite lateral face the fibers appear to be in somewhat random but transverse orientation (FIG. 2). The lateral face shown in FIG. 2 was adjacent to the surface 51 of end cap 38 while the lateral face shown in FIG. 3 was adjacent to the terminal face 50 of nozzle 23 as the moldable material was expressed through branch 34.

The uni-directional fibers, aligned with the direction of extrusion, tend to impart strength in a longitudinal direction and consequently better handleability in the winding operation when winding the tape in roll package form. The random or non-uni-directional orientation is desirable to prevent separation into longitudinal segments during handling and after the tape is put into service, particularly when used in ablation insulation systems to deter formation of longitudinal incipient cracks which lead to directional and premature deterioration. The randomly oriented fibers also tend to hold the carbon char formed during the endothermic reaction of the resinous material until the reaction is completed and consequently reduces the erosion rate of the ablative material. The carbon char, which is an intermediate product of the endothermic reaction, is one of the best transient heat barriers known. The holding effect of the randomly oriented fibers is pronouncedly enhanced with increased fiber lengths.

Tests were performed on two different molding compositions extruded through the apparatus of this invention and mocked up and molded at 100 p.s.i. to produce a test sample block 6 inches by 6 inches by ½ inch. The blocks were fastened in a holder for impingement by a flame, approximate temperature 4000° F., emitted from an oxyacetylene torch with the distance between the tip and the sample being 1½ inches. The gas flow of the oxygen was 2.13 c.f.m. at 60 p.s.i. and that of the acetylene was 1.61 c.f.m. at 15 p.s.i. For samples containing 40–45 percent phenolic resins, 3 percent titanium dioxide, 52–57 percent asbestos grade 3R fibers, the ablation or flame erosion rate was determined to be 2.75 mils per second. For samples containing 45–50 percent phenolic resin, 6 percent potassium titanate, 44–49 percent asbestos grade 3R fibers, the flame erosion rate was determined to be 2.19 mils per second.

From the foregoing specification, it is apparent that this disclosure is one of a new extruded molding material and of new method for producing extruded molding material in tape form. These new molding tapes are distinguished by the fact that they possess two distinct patterns of fiber distribution. In one pattern some of the fibers are generally aligned along the longitudinal extent of the tape, which corresponds to the direction of extrusion. This pattern facilitates handleability. In the other pattern some of the fibers are in random but controlled orientation wherein the fibers are primarily transverse to the longitudinal extent of the formed tape. This random and homogeneous fiber orientation imparts resistance to the molding material to ablate non-uniformly in "chunks" when employed in thermal ablation systems.

It should be noted that moldable materials containing fibers and the compositions described above were extruded through extruders such as disclosed in FIGS. 7, 8 and 9 and that there occurred certain disadvantages. The fibers in the tapes extruded in such extruders were substantially all aligned in the direction of extrusion and tended to separate and produce cleavages to the extent such that a unitary tape could not be continuously extruded. Naturally, such tape could not be easily handled and has little utility when a uniform product is desired, both from the standpoint of appearance and other physical characteristics such as ablation resistance. The longitudinal alignment of the fibers in a direction corresponding to the direction of extrusion was somewhat expected in the product extruded through "straight-thru" extruder nozzle 123 disclosed in FIG. 7 but was surprisingly unexpected in the product extruded through extruder nozzle 223 disclosed in FIG. 8. It appears that in the extruder of FIG. 8 the fibers were merely sharply diverted in transverse orientation to the longitudinal alignment produced by expressing the fibers through the branch passage 230 section of the extruder.

In FIG. 9, the enlarged branch 334 was partially defined by an arcuate sidewall 335 of uniform radius and tangent lines 341 and 342 extending therefrom. In the tape extruded, splits occurred in the center portion indicating that the molding material never knitted together after "mushrooming" at the discharge opening. Surprisingly, the extruder disclosed in FIG. 9 also could not produce a unitary tape having the fibers in the preferred orientation patterns obtained in the extruder of this invention. Thus it appears that in order to obtain the controlled random orientation in an extruded molding material the material should be expressed into an expanded extrusion passage branch defined by curved walls of successive segments of different curvatures, which curved walls diverge from each other about the point where the material is introduced into the expanded branch. It further appears that the sidewalls, such as 41 and 42, of the discharge opening of the extrusion passage cannot be diverged in the direction represented by dimension D without correspondingly converging the said sidewalls in the direction represented by dimension C to produce a unitary extruded form of moldable material containing fibers and having a randomly oriented pattern of relatively long fibers at one face of the produced form.

However, satisfactory extruded moldable tapes containing fibers have been produced when the extruder disclosed in FIG. 6 was used. The extruder disclosed there corresponds to that shown in FIG. 4 except that the divergent curved lines 443 and 444 are spaced apart a distance greater than the distance between lines 441 and 442 to form a restriction 454 between passage branches 431 and 434. An advantage obtained by the provision of such restriction is that the edges of the formed tape 12 are slightly compressed and any tendency for feathered edges is deterred.

Having provided a complete description of the invention in such a manner to distinguish it from other inventions and from what is old and having provided a description of the preferred conditions needed in order to carry out the invention, the scope of the patent to be granted is to be determined by the following claims.

What I claim:

1. A process of extruding moldable material containing fibers comprising the steps of: expressing a mixture of fibers and moldable compound through a first extrusion passage branch into an expanded second extrusion passage branch transverse to said first branch, said second passage branch having a semi-oval portion being defined by arcuate sides on opposite sides of a major axis of symmetry, which arcuate sides comprise a series of successive segments of different curvatures, and diverting at least some of the fibers by causing said material to strike said arcuate sides.

2. A process of extruding moldable material containing fibers comprising the steps of: extruding a mixture of said moldable material and fibers in a first direction to generally orient said fibers in the direction of expression; further extruding said moldable material in a second direction generally transverse to said first direction, and in a passage including a semi-oval portion defined by arcuate sidewall portions; and diverting at least a portion of said fibers, to present a combination of directionally oriented and randomly oriented fibers in a unitary form, by causing and portion to strike said arcuate sidewall portions.

3. A process of extruding moldable strip material containing fibers, which material resists separation into a plurality of segments along the longitudinal extent of the fibers, comprising the steps of: mixing a supply of fibers together with uncured resin; forcing the resultant mix through an extruder first along a longitudinal path to unidirectionally align at least a portion of the fibers in a direction corresponding to said longitudinal path; further forcing the mix in a second path transverse to said first path and expanding the material in a direction corresponding to the width of the product being formed, said second path including a semi-oval portion defined by arcuate sidewall portions; diverting at least a portion of the fibers from said unidirectional alignment by causing said portion of the fibers to strike said sidewall portions; and withdrawing the extruded product without substantially stretching the same.

4. A process of extruding a homogeneous mix of moldable material containing fibers to preferentially orient the fibers within the material comprising: expressing a supply of said mix through a first extrusion passage branch of an extruder at a pressure in the order of 2000 p.s.i.; to orient the fibers in a first direction corresponding generally to the direction of expression; sharply bending said material into a second passage branch and expanding said material in a direction transverse to the direction of expression, said second passage branch having a semi-oval portion defined by arcuate sidewall portions; re-orienting a substantial portion of the fibers in a direction generally transverse to the longitudinal direction of expression by causing said fibers to strike said sidewall portions; transferring the material into a third passage branch having a cross-sectional configuration conforming generally to that of the product desired; and discharging the moldable material.

(References on following page)

References Cited

UNITED STATES PATENTS

| | | | |
|---|---|---|---|
| 2,315,851 | 4/1943 | Goldman | 161—59 |
| 2,372,177 | 3/1945 | Conner | 264—108 |
| 2,602,187 | 7/1952 | Samler | 264—176 |
| 2,702,410 | 2/1955 | Brown | 264—176 |
| 2,777,787 | 1/1957 | Bragg | 161—59 |
| 2,791,806 | 5/1957 | Tordella | 264—176 |

FOREIGN PATENTS

| | | |
|---|---|---|
| 433,245 | 8/1935 | Great Britain. |

ROBERT F. WHITE, *Primary Examiner.*

S. A. HELLER, G. AUVILLE, *Assistant Examiners.*